US008139828B2

(12) United States Patent
Huo et al.

(10) Patent No.: US 8,139,828 B2
(45) Date of Patent: Mar. 20, 2012

(54) METHOD FOR ENHANCED VISUALIZATION OF MEDICAL IMAGES

(75) Inventors: Zhimin Huo, Pittsford, NY (US); Jing Zhang, HuangPu District (CN)

(73) Assignee: Carestream Health, Inc., Rochester, NY (US)

( * ) Notice: Subject to any disclaimer, the term of this patent is extended or adjusted under 35 U.S.C. 154(b) by 1317 days.

(21) Appl. No.: 11/549,130

(22) Filed: Oct. 13, 2006

(65) Prior Publication Data

US 2007/0269106 A1 Nov. 22, 2007

Related U.S. Application Data

(60) Provisional application No. 60/729,124, filed on Oct. 21, 2005.

(51) Int. Cl.
*G06K 9/00* (2006.01)
*G06K 9/40* (2006.01)
(52) U.S. Cl. .......................... 382/128; 382/170; 382/274
(58) Field of Classification Search .................. 128/922; 382/199, 190, 168–172, 128–132
See application file for complete search history.

(56) References Cited

U.S. PATENT DOCUMENTS

| | | | | |
|---|---|---|---|---|
| 5,450,502 A * | 9/1995 | Eschbach et al. | ............. | 382/169 |
| 5,467,404 A * | 11/1995 | Vuylsteke et al. | ............. | 382/274 |
| 5,581,370 A * | 12/1996 | Fuss et al. | ....................... | 358/447 |
| 5,633,511 A * | 5/1997 | Lee et al. | ....................... | 250/587 |
| 5,963,665 A * | 10/1999 | Kim et al. | ....................... | 382/169 |
| 6,463,173 B1 * | 10/2002 | Tretter | .......................... | 382/168 |
| 6,507,372 B1 * | 1/2003 | Kim | .............................. | 348/630 |
| 6,611,627 B1 * | 8/2003 | LaRossa et al. | ............. | 382/240 |
| 6,766,064 B1 * | 7/2004 | Langan et al. | ................ | 382/274 |
| 6,836,570 B2 * | 12/2004 | Young et al. | .................. | 382/274 |
| 6,956,975 B2 * | 10/2005 | Young | .......................... | 382/263 |
| 7,233,708 B2 * | 6/2007 | Li et al. | ......................... | 382/305 |
| 7,317,842 B2 * | 1/2008 | Lin et al. | ....................... | 382/261 |
| 7,379,627 B2 * | 5/2008 | Li et al. | ......................... | 382/305 |
| 7,426,312 B2 * | 9/2008 | Dance et al. | .................. | 382/254 |
| 2002/0181797 A1 | 12/2002 | Young | | |
| 2003/0091222 A1 * | 5/2003 | Young et al. | .................. | 382/132 |

OTHER PUBLICATIONS

Eramian et al, Histogram equalization using neighborhood metrics, Computer and Robot Vision, 2005. Proceedings. The 2nd Canadian Conference on May 9-11, 2005 pp. 397-404.*
Buzuloiu et al, Adaptive-neighborhood histogram equalization of color images, Journal of Electronic Imaging 10(2), 445-459 (Apr. 2001).*
Reza, Realization of the Contrast Limited Adaptive Histogram Equalization (CLAHE) for Real-Time Image Enhancement, Journal of VLSI Signal Processing Systems, vol. 38 , Issue 1 (Aug. 2004).*
Kim et al, an Advanced Contrast Enhancement Using Partially Overlapped Sub-Block Histogram Equalization, IEEE Transactions on Circuits and Systems for Video Technology, vol. 11, No. 4, Apr. 2001.*
Joung-Youn Kim et al., An Adnvanced Contrast Enhancement Using Partially Overlapped Sub-Block Histogram Equalization, IEEE Transactions on Circuits and Systems for Video Technology, vol. 11, No. 4, Apr. 2004, pp. 475-484—XP-001093567.
Stephen M. Pizer et al., Adaptive Histogram Equalization and Its Variations, Computer Vision, Graphics, and Image Processing, vol. 39, 1987, pp. 355-368, XP-001002914.
M. Kamel et al., Histogram Equalization Utilizing Spatial Correlation for Image Enhancement, SPIE, vol. 1199, Visual Communications and Image Processing IV, 1989, pp. 712-721, XP009079466.

* cited by examiner

*Primary Examiner* — Andrae S Allison

(57) ABSTRACT

A method to process medical images for a desired global and local contrast enhancement. A digital image is accessed and segmented, and a first histogram of the digital image is generated. An overall contrast enhanced histogram is generated using the first histogram. A local contrast enhanced histogram is generated using the first histogram. A combined histogram is generated using the overall contrast enhanced histogram and the local contrast enhanced histogram. A contrast-enhanced digital image is generated using the combined histogram.

24 Claims, 7 Drawing Sheets

METHOD FOR ENHANCED VISUALIZATION OF MEDICAL IMAGES

CROSS REFERENCE TO RELATED APPLICATIONS

Reference is made to, and priority is claimed from, commonly assigned provisional patent application U.S. Ser. No. 60/729,124, entitled "Method for Enhanced Visualization of Medical Images", filed on Oct. 21, 2005, in the name of Huo.

FIELD OF THE INVENTION

The invention relates generally to the field of visualization and display of medical images. More specifically, the invention relates to a method for enhanced visualization of mammographic images, for example, for diagnosis of breast cancer.

BACKGROUND OF THE INVENTION

Breast cancer is a frequently diagnosed malignancy among women in the United States. Early detection of breast cancer can improve survival rates. Studies show that use of screening mammography can reduce lesion size and stage at detection, improving the prognosis for survival. Currently, mammography is a well-established imaging technique for early detection of breast cancer. Annual screening mammography is recommended by the American Cancer Society for all women over the age of 40.

Further improvement in screening mammography technology is needed. Studies showed that some breast cancer is missed. Further, despite improved radiographic criteria for differentiating malignant from benign lesions of the breast, misclassification of lesions can occur in everyday clinical practice. An objective for new technology development in detection and diagnosis of breast cancer is to help radiologists to improve both the sensitivity and specificity (i.e., improve breast cancer detection rate) while minimizing the number of benign cases sent for biopsy.

Mammography has been advanced dramatically with improvements in mammographic screen-film image quality, image acquisition and computer vision techniques including computer-aided diagnosis (CAD). At least one study showed that use of CAD improved the breast cancer detection rate. Further, radiology gradually started its transition from analog mammography to digital mammography. Some advantages of digital over analog are believed to be the improved overall contrast; and the ability to manually manipulate the contrast of images on a softcopy display.

The contrast in mammography has been viewed as an important criteria. Clinical acquisition of x-ray mammograms requires specific techniques in order to obtain high quality images. Attenuation differences between various structures within the breast contribute to image contrast. Due to the similar composition of breast structures and the physical manifestations of breast carcinoma, mammographic imaging must be substantially different from general radiographic imaging. Low-energy x-rays are required to enhance the contrast to differentiate between normal tissues and carcinoma. One way to increase image contrast is to increase radiation dose. Because of the absorption of low-energy x-ray is higher than high-energy x-ray, radiation dose becomes a concern for mammography. This requires that traditional screen/film for mammography has much higher contrast than general radiography for imaging head, chest, abdomen, and extremities.

Digital mammography in part addresses the limitation of screen/film system on contrast i.e., the limited dynamic range. However, because of the similar density of breast tissues and the concern of the radiation dose, the breast is imaged within a narrow range of the available dynamic range. There are other factors affecting the image quality including proper x-ray exposure, quality of soft copy display, the dynamic range of the display and proper image processing to optimally display the images.

Because of the role of contrast in the diagnostics accuracy in mammography, various techniques and methods have been developed to enhance the low-contrast image to help radiologists to better visualize the abnormalities. Methods have been developed for improving disease diagnosis using contrast enhancement weighted for different frequency contents in mammographic and digital portal images. For example, see commonly assigned U.S. Patent Published Application No. 2002/0181797 (Young) and U.S. Patent Published Application No. 2003/0091222 (Young).

The present invention is directed to processing mammographic images acquired digitally. The method is directed to enhancing the overall contrast of the images while preserving the detail contrast.

SUMMARY OF THE INVENTION

An object of the present invention is to provide a method to render digital mammographic images with both global contrast enhancement and local contrast enhancement.

Any objects provided are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for enhancing the image contrast of a digital image, comprising: accessing the digital image; segmenting the digital image; generating a first histogram of the digital image; generating an overall contrast enhanced histogram using the first histogram; generating a local contrast enhanced histogram using the first histogram; generating a combined histogram using the overall contrast enhanced histogram and the local contrast enhanced histogram; and using the combined histogram to generate a contrast-enhanced digital image.

In one particular arrangement, the combined histogram is determined by a weighted combination of the overall contrast enhanced histogram and the local contrast enhanced histogram.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 3A-3F illustrate histograms, wherein FIG. 3A shows a histogram of an unprocessed segmented breast region; FIG. 3B shows a histogram of a processed image after histogram equalization (HE); FIG. 3C shows a histogram of a processed image after spatial correlation histogram equalization (SCHE); and FIGS. 3D-3F show histograms of processed images, each with a different value of a weighting factor γ.

DETAILED DESCRIPTION OF THE INVENTION

Figure 1:
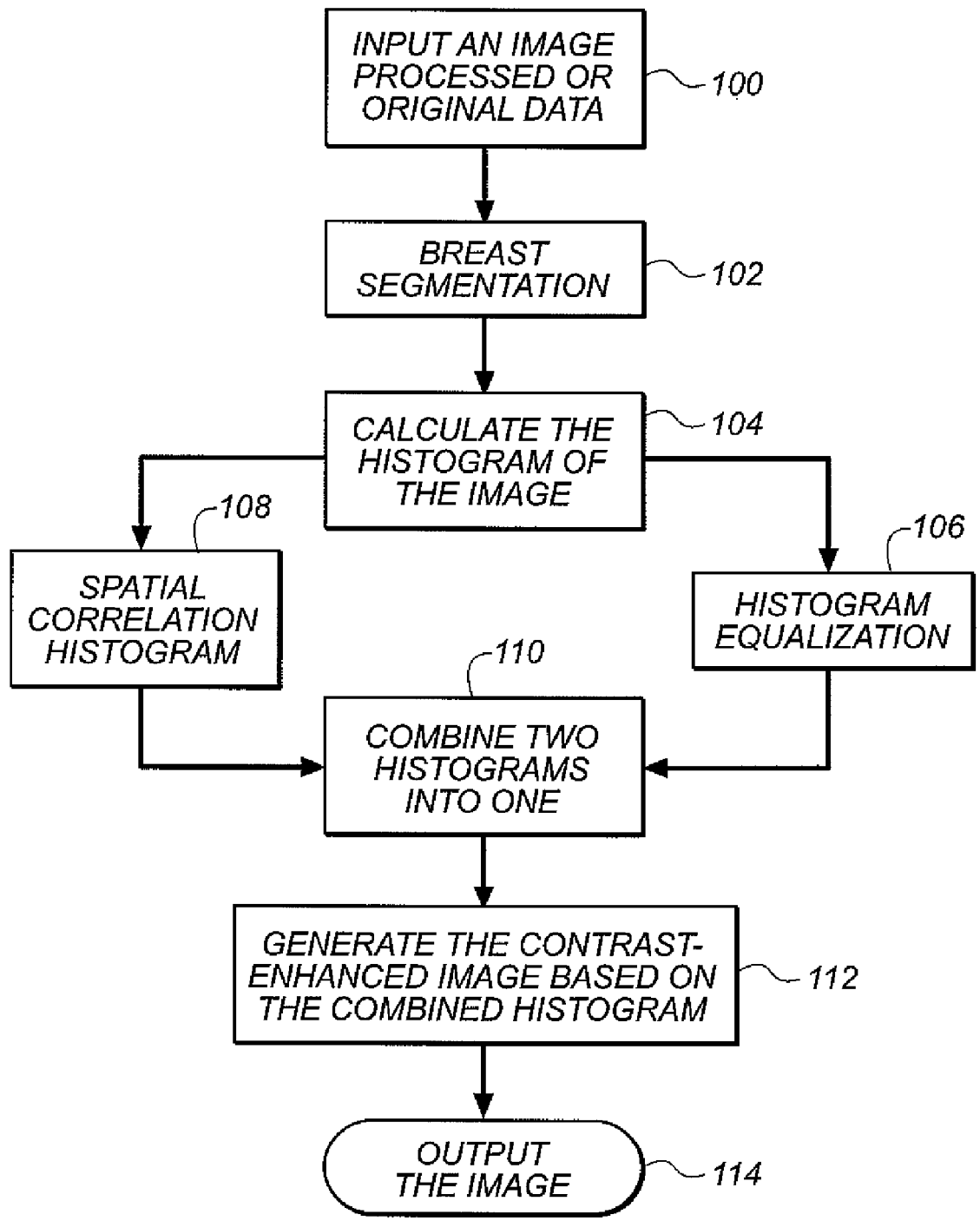
FIG. 1 diagrammatically illustrates the steps of a method in accordance with the present invention.

The following is a detailed description of the preferred embodiments of the invention, reference being made to the drawings in which the same reference numerals identify the same elements of structure in each of the several figures.

Histogram Equalization (HE) is a known method for contrast enhancement, and has been used for global contrast enhancement. It is considered beneficial to enhance the global contrast of an image. However, when global contrast is maximized/optimized, local contrast in some areas is not optimized or even suppressed.

When a medical image is ordered for a specific reason by a clinician/radiologist, the clinician/radiologist is usually looking for specific abnormalities in the image(s) they ordered. An optimal way to process images for better visualization is to maximally enhance the signals radiologists are looking for, while minimally enhance or even suppress other signals. Because of the limitation in global contrast enhancement such as histogram equalization, local contrast enhancement is used to enhance the contrast in identified regions of interest. Contrast-limited adaptive histogram enhancement (CLAHE) is a technique employed to apply histogram analysis to small regions in an image to achieve global enhancement while preventing the loss of local contrast.

FIG. 1 is briefly described. At step 100, a digital image is accessed. For the present invention, the digital image is a mammography image. The digital image is then segmented (step 102) and a histogram of the image is generated (step 104). Using the histogram generated at step 104, an overall contrast enhanced histogram (for example, histogram equalization (HE)) is generated (step 106), and a local contrast enhanced histogram (for example, spatial correlation histogram equalization (SCHE)) is generated (step 108). The two histograms generated at steps 106 and 108 are then combined (as will be more particularly described below) to generate a combined histogram (step 110). A contrast enhanced digital image is then generated at step 112 using the combined histogram. The contrast enhanced digital image can then be displayed, stored, transferred, and/or printed (step 114).

The breast is composed primarily of two components, fibroglandular tissue and fatty tissue. Some breast diseases develop from the terminal ductal lobular units of the breast, and can arise from the epithelial cells that line the ducts; however, the fibrous or connective tissue can also be involved. Many breast carcinomas can be seen on a mammogram as a mass, a cluster of tiny calcifications, or a combination of both. Other mammographic abnormalities are of lesser specificity and prevalence than masses and/or calcifications, and include skin or nipple changes, abnormalities in the axilla, asymmetric density, and architectural distortion. A preferred enhancement method for mammography is to enhance global contrast and local contrast so that radiologists can detect abnormalities more easily.

Figure 2:
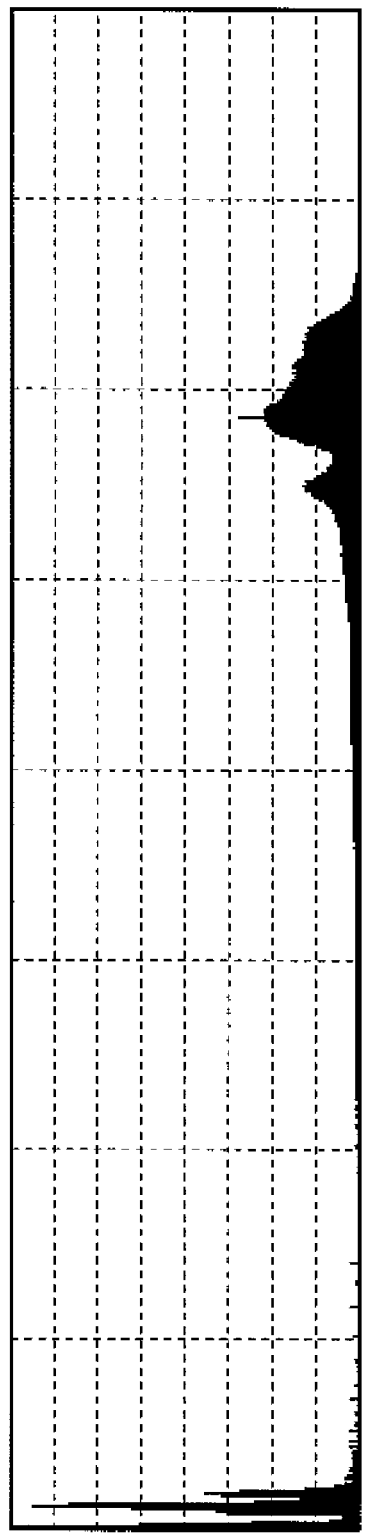
FIG. 2 shows a histogram of an unprocessed mammogram.
Figure 3B:
Figure 3D:
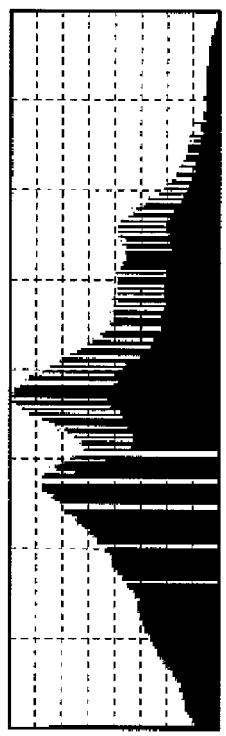
Figure 3F:
Figure 3A:
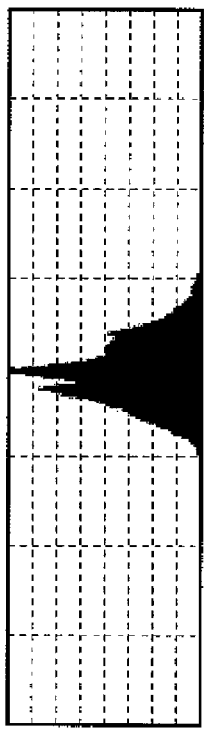

Some mammograms have very narrow dynamic ranges when they are acquired (FIG. 2). A wide range of the gray scale is used to image non-breast area. For example, the background uses a good portion of the available gray scale space. It is preferred to segment the breast region from a mammogram, then perform contrast enhance to modify the histogram of the breast by stretching the dynamic range to all the available gray level range, i.e., 0 to 4096. FIG. 3A shows a histogram (step 104) for an (unprocessed) segmented breast area (of the digital image shown in FIG. 4A) representing the distribution of the breast tissue in gray scale.

Through the investigation of a number of mammograms, Applicant determined common features in their histograms.

Generally referring to FIG. 3A, the histograms of mammograms have two major peaks (one for fat and one for glandular tissue) and two tails at both ends. Calcifications and small areas of very dense tissues (sometimes including masses) are located at the high end of the histogram. The tail (at the low end) is contributed mainly from the tissue along the breast borderline in the mammogram. The information on both tails includes relevant information for radiologists. More particularly, radiologists want to detect calcifications and dense masses in the high-end tail. Further, radiologists want to detect problems along the skin line including subtle masses and calcifications along the borderline.

Because of the narrow range used for the breast area, global contrast enhancement is desired to enhance the overall contrast. Histogram equalization (HE) was applied to stretch the histogram. For example, the middle portion of the histogram (of FIG. 3A) is enhanced/stretched as shown in FIG. 3B, which contributes to the contrast improvement of the corresponding mammography image shown in FIG. 4B.

Figure 4C:
FIGS. 4A-4F illustrate images corresponding to the histograms shown in FIGS. 3A-3F.
Figure 4F:
Figure 4B:
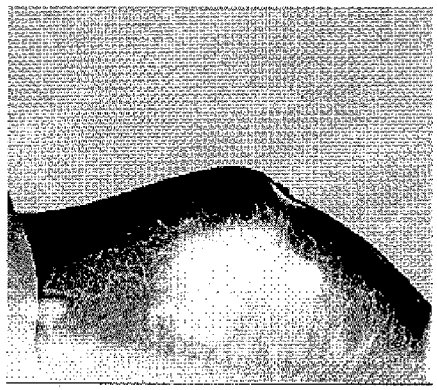
Figure 4E:
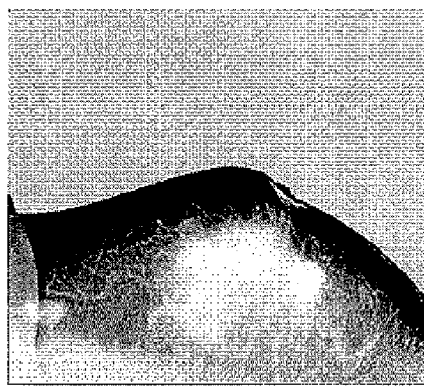
Figure 4A:
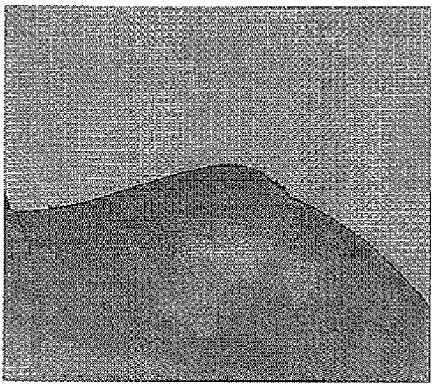
Figure 4D:
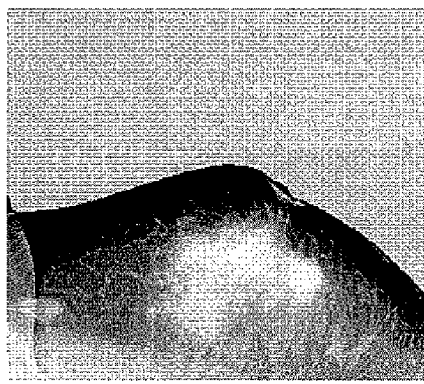

However, the clipping at the tails at both ends (FIG. 3B) can be a problem. The suppression at both the high and low gray level is shown in the image of FIG. 4B. A purpose of enhancement is to increase the contrast of mammograms by enlarging their dynamic range while highlighting the clinically relevant details. It is desirable to preserve the tails or even enhance certain parts of the tail as the information on the tails is important to radiologists.

Figure 3C:
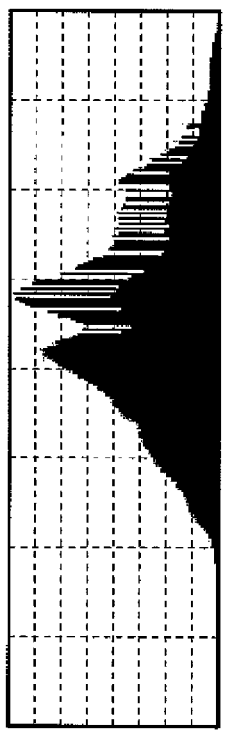
Figure 3E:
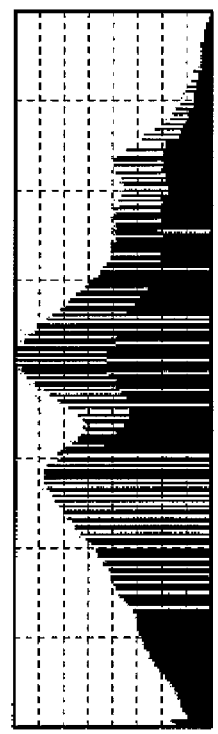
Figure 5A:
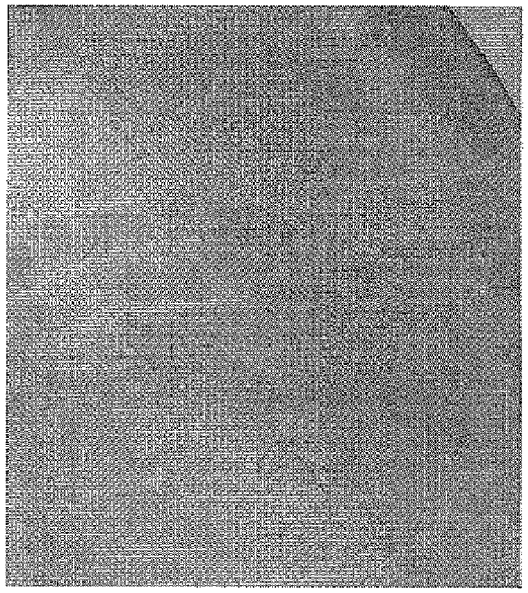
FIGS. 5A-5D illustrate the segments of images with calcifications from (A) unprocessed, (B) processed after HE, (C) processed after SCHE, and (D) processed after applying a particular method.
Figure 5B:
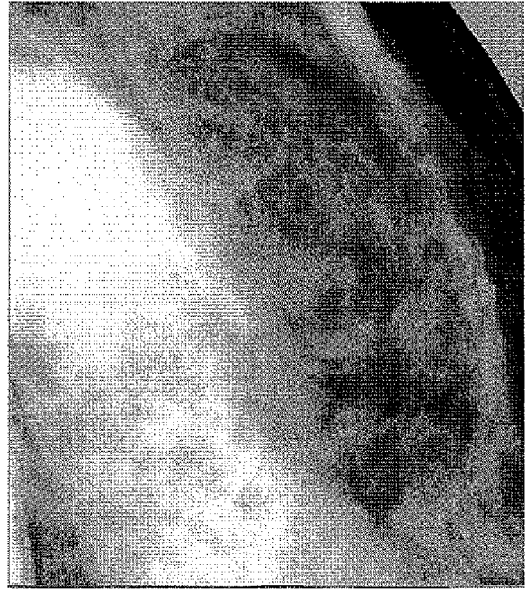
Figure 5C:
Figure 5D:
Figure 6A:
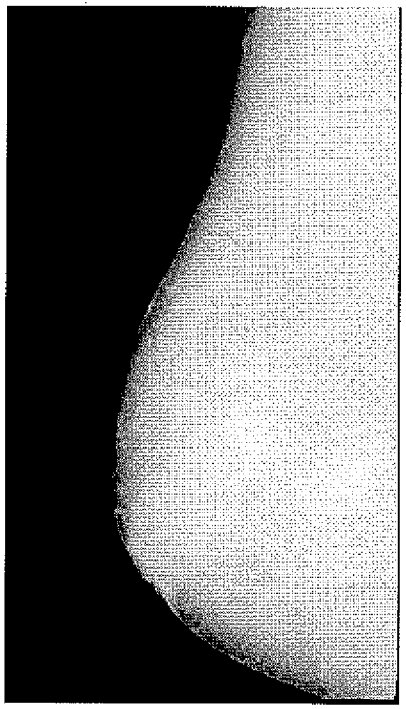
FIGS. 6A-6D show (A) an unprocessed image, (B) a processed image after SCHE, (C) a processed image after applying a particular method, and (D) a processed image after applying another particular method.
Figure 6B:
Figure 6C:
Figure 6D:
Figure 7A:
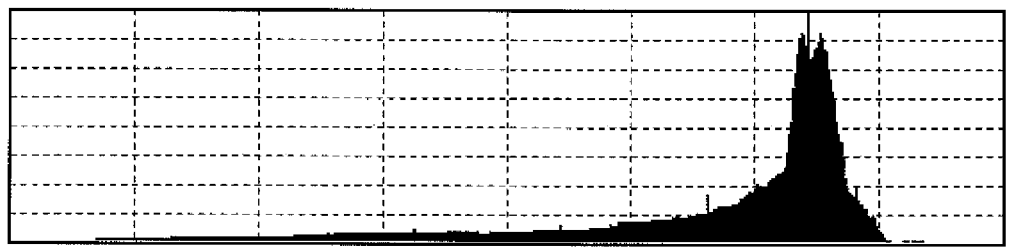
FIGS. 7A-7D show the histograms of (A) an unprocessed image, (B) a processed image after SCHE, (C) a processed image after HE, and (D) a processed image after applying a particular method.
Figure 7B:
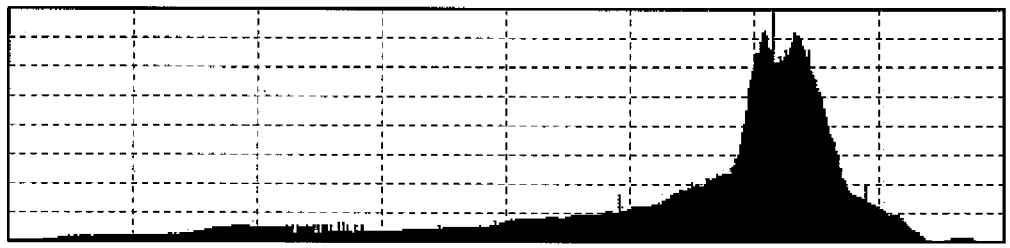
Figure 7C:
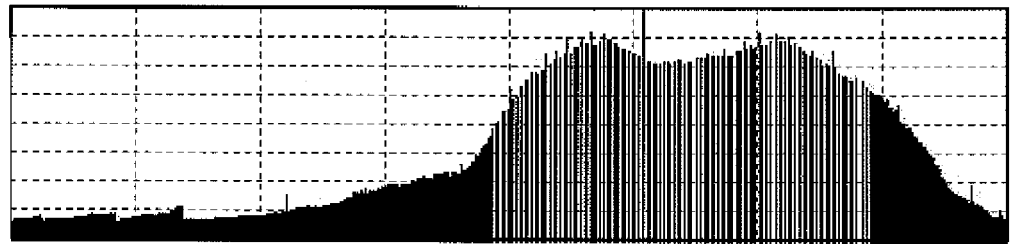
Figure 7D:
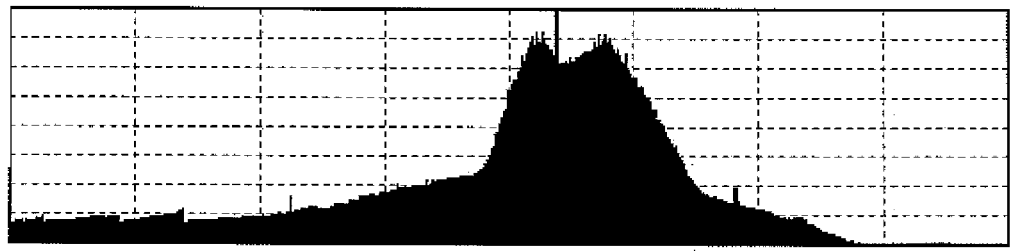

To overcome the shortcoming of HE, Applicant introduced spatial correlation histogram equalization (SCHE), which takes the spatial relationship of pixels into account. Contrast for detailed information such as calcifications, which is less correlated with their neighborhood pixels, may improve as shown in FIGS. 5C-5D. FIG. 3C illustrates the resulting histogram after using SCHE. Note that the gray levels at the high end of histogram were not suppressed, but rather extended. Thus the details were preserved and/or even enhanced.

As indicated above, FIG. 3C illustrates the resulting histogram after applying SCHE to the histogram of the segmented breast region shown in FIG. 3A. The ability to enhance both global and local contrast is demonstrated. The following describes a method for calculating SCHE.

(A) Calculating the gray-level histogram p(k) of an original image as equation (1):

$$p(k) = \frac{m_k}{m} \quad k = 0, 1, 2, \ldots, n-1 \tag{1}$$

wherein m is the total number of pixels in the original image, $m_k$ is the number of pixels of gray level k, and n is the total number of gray levels.

(B) Calculating the spatial correlation histogram $\bar{p}(k)$ of original image as equation (2):

$$\bar{p}(k) = \frac{\sum_{b=k-\alpha}^{k+\alpha} p(b|k)}{\sum_{a=0}^{n-1} \sum_{b=a-\alpha}^{a+\alpha} p(b|a)} \qquad (2)$$

wherein the conditional probability $p(b|a)$ is defined as:

$$p(b|a) = \frac{\sum_{u=0}^{N-1} \sum_{v=0}^{M-1} \left[ \sum_{w=u-\beta}^{u+\beta} \sum_{z=v-\beta}^{v+\beta} H(a, q(u,v)) \cdot H(b, q(w,z)) \right] / \sigma(\beta)}{\sum_{u=0}^{N-1} \sum_{v=0}^{M-1} H(a, q(u,v))} \qquad (3)$$

where $(, q(x, y)) = \begin{cases} 0 & g \neq q(x,y) \\ & = (x,y) \end{cases}$ and $q(x, y)$ is the gray level at pixel $(x, y)$, $\sigma(\beta)=(2\beta+1)\times(2\beta+1)$, N and M are the width and height of a mammogram respectively. The element $q(x, y)$ denotes the probability of gray level being b for pixels in a neighborhood centered by a pixel with gray level being a.

Details on both ends are well preserved and even enhanced using SCHE. As shown in FIGS. 5B and 5C, typically, the overall contrast of the image using SCHE (FIG. 5C) is not as preferred as that of HE (FIG. 5B). It is desirable to balance the enhancement of details and overall contrast.

There are various ways to balance between the overall contrast enhancement and the enhancement of detailed contrast. The following illustrate different ways to combine the HE (overall contrast enhancement) and the SCHE (detail contrast).

1) Method 1—A Two-Part Combination of HE p(k) and SCHE $\bar{p}(k)$. In this method, portions of the two histograms (HE and SCHE) are used. In this particular example, a left portion of HE p(k) is combined with a right portion SCHE $\bar{p}(k)$ a) First, select a grey level value on the histogram as a threshold k'. k' can be any value between 0 and 4096. For example, select k'=2/n. Then, set the threshold k|p(k)=2/n.

b) Divide the gray level space into two parts:

$K=\{k|p(k^*)<2|n, p(k^*+1) \geq 2/n, k=0,1,2, \ldots k^*\}$ $\bar{K}=\{0,1,\ldots,n-1\}-K$ c) Calculate the new histogram by combining the two histograms using equation (4)

$$()_{new} = \begin{cases} (k), & \epsilon \\ \frac{\bar{p}(k)}{\sum_{i \in \bar{K}} \bar{p}(i)} \cdot \left(1 - \sum_{i \in K} p(i)\right), & k \in \bar{K} \end{cases} \qquad (4)$$

d) Calculate a Cumulative Distribution Function $F(k)_{new}$ and a Yield Mapping Function to map the new histogram to a contrast-enhanced image based on the combined histogram:

$$k' = n \cdot F(k)_{new} = n \cdot \sum_{i=0}^{k} p(i)_{new}. \qquad (5)$$

2) Method 2—Weighted combination of HE p(k) and SCHE $\bar{p}(k)$.

In this method, portions of the two histograms (HE and SCHE) are used. However, a weighting factor is applied to the portions, such that the combined histogram is a weighted combination of HE p(k) and SCHE $\bar{p}(k)$.

a) Produce a new histogram:

$$p(k)_{new} = \gamma p(k) + (1-\gamma)\bar{p}(k) * (0 < \gamma < 1). \qquad (6)$$

b) Calculate a Cumulative Distribution Function $F(k)_{new}$ and a Yield Mapping Function to map the new histogram to a contrast-enhanced image based on the combined histogram:

$$k' = n \cdot F(k)_{new} = n \cdot \sum_{i=0}^{k} p(i)_{new}. \qquad (7)$$

The balance between the overall contrast enhancement and local detail contrast is determined by the threshold for Method 1 and by $\gamma$ for Method 2. The variations of Method 2 are the combinations of the two histograms with different weighting factors within different gray level ranges. It is noted that Method 1 is a special case of Method 2 where $\gamma=1$ for $k \in K$ space (grey level space) and $\gamma=0$ for $k \in \bar{K}$.

A more general form of equation (6) would be as shown in equation (8), i.e., a different $\gamma$ applied to a selected K space.

$$\begin{cases} p(k)_{new} = \gamma p(k) + (1-\gamma)\bar{p}(k) * (0 < \gamma < 1). & k \in K \\ p(k)_{new} = \gamma' p(k) + (1-\gamma')\bar{p}(k) * (0 < \gamma' < 1). & k \in \bar{K} \end{cases} \qquad (8)$$

The information at the low end of the histogram appears dark on the film. The information at the high end of the histogram appears bright on the film. The image contents may become too dark to see when the gray level is below a certain value. The enhancement for the low-end of the histogram needs to be addressed differently from that of the high end.

Further, density correction has been used to correct the non-uniform distribution of breast density on breast x-ray images. The x-ray images are projections of the compressed breast. The non-uniformity of breast density in the projection view is due to the difference in the cumulated amount of breast tissue from the chest wall to the nipple. The density correction can be applied before and after the contrast enhancement described.

It is noted that the method can be applied to an unprocessed or processed image to improve the contrast.

The method can provide a balance between the overall and local contrast enhancement based on the need for different applications. With a balancing between the global contrast and local detail contrast enhancement, a desired contrast enhancement can be achieved. The method can provide sufficient overall contrast enhancement of the image while preserving or enhancing detail contrast, thus helping clinicians to visualize the details of abnormalities detect and diagnose of cancers.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for enhancing the image contrast of a digital mammographic image, comprising using a computer to perform steps of:
   accessing the digital mammographic image;
   segmenting the digital mammographic image to identify a region of interest based on gray level of dense breast tissue;
   generating a first histogram of the segmented digital mammographic image;
   generating a global contrast enhanced histogram by applying histogram equalization to the first histogram;
   generating a detail contrast enhanced histogram for the region of interest by applying spatial correlation histogram equalization to the first histogram using spatial relationships of pixels in the region of interest, thereby preserving gray level detail at a tail end of the detail contrast enhanced histogram;
   generating a combined histogram using the global contrast enhanced histogram and the detail contrast enhanced histogram; and
   using the combined histogram to generate a contrast-enhanced digital mammographic image.

2. The method of claim 1, wherein the combined histogram is determined by a weighted combination of the global contrast enhanced histogram and the detail contrast enhanced histogram.

3. The method of claim 1, wherein the combined histogram is generated by selecting a gray level value on the first histogram as a threshold.

4. The method of claim 1, wherein the combined histogram is determined by an equally weighted combination of the global contrast enhanced histogram and the detail contrast enhanced histogram.

5. The method of claim 1, wherein the combined histogram is determined by an unequally weighted combination of the global contrast enhanced histogram and the detail contrast enhanced histogram.

6. The method of claim 1, wherein the combined histogram is determined by a combination of weighting factors and gray level spaces.

7. A method for enhancing the image contrast of a digital mammographic image, comprising using a computer to perform steps of:
   accessing the digital mammographic image;
   generating a first histogram of the digital mammographic image;
   generating an overall contrast enhanced histogram by applying histogram equalization to the first histogram;
   generating a detail contrast enhanced histogram by applying spatial correlation histogram equalization to the first histogram, wherein the step of applying spatial correlation histogram equalization comprises:
   (a) calculating a gray-level histogram of the digital mammographic image to identify dense breast regions; and
   (b) calculating a spatial correlation histogram of the digital mammographic image, thereby preserving gray level detail at a tail end of the detail contrast enhanced histogram;
   generating a combined histogram using the overall contrast enhanced histogram and the detail contrast enhanced histogram; and
   using the combined histogram to generate a contrast-enhanced digital mammographic image.

8. The method of claim 7, wherein the combined histogram is determined by a weighted combination of the overall contrast enhanced histogram and the detail contrast enhanced histogram.

9. The method of claim 7, wherein the combined histogram is generated by selecting a gray level value on the first histogram as a threshold.

10. The method of claim 7, wherein the combined histogram is determined by an equally weighted combination of the overall contrast enhanced histogram and the detail contrast enhanced histogram.

11. The method of claim 7, wherein the combined histogram is determined by an unequally weighted combination of the overall contrast enhanced histogram and the detail contrast enhanced histogram.

12. The method of claim 7, wherein the combined histogram is determined by a combination of weighting factors and gray level spaces.

13. A method for enhancing the image contrast of a digital mammographic image, comprising using a computer to perform steps of:
   accessing the digital mammographic image;
   generating a first histogram of the digital mammographic image;
   generating an overall contrast enhanced histogram by applying histogram equalization to the first histogram;
   generating a detail contrast enhanced histogram by applying spatial correlation histogram equalization to the first histogram, wherein the applying step comprises:
   (a) selecting a gray level on the first histogram as a threshold level; and
   (b) dividing the gray level into a plurality of parts, thereby preserving gray level detail at a tail end of the detail contrast enhanced histogram;
   generating a combined histogram by combining the overall contrast enhanced histogram and the detail contrast enhanced histogram;
   calculating a cumulative distribution function and a yield mapping function; and
   mapping the combined histogram to a contrast-enhanced digital mammographic image using the cumulative distribution function.

14. The method of claim 13, wherein the combined histogram is determined by a weighted combination of the overall contrast enhanced histogram and the detail contrast enhanced histogram.

15. The method of claim 13, wherein the combined histogram is determined by an equally weighted combination of the overall contrast enhanced histogram and the detail contrast enhanced histogram.

16. The method of claim 13, wherein the combined histogram is determined by an unequally weighted combination of the overall contrast enhanced histogram and the detail contrast enhanced histogram.

17. The method of claim 13, wherein the combined histogram is determined by a combination of weighting factors and gray level spaces.

18. A method for enhancing the image contrast of a digital mammographic image, comprising using a computer to perform steps of:
   accessing the digital mammographic image;
   generating a first histogram of the digital mammographic image;
   generating an overall contrast enhanced histogram by applying histogram equalization to the first histogram;
   generating a detail contrast enhanced histogram by applying spatial correlation histogram equalization to the first histogram, thereby preserving gray level detail at a tail end of the detail contrast enhanced histogram, the step of generating a detail contrast enhanced image comprising steps of:
   (a) calculating a gray-level histogram p(k) of the digital mammographic image using equation (1)

$$p(k) = \frac{m_k}{m} \quad k = 0, 1, 2, \ldots, n-1 \quad (1)$$

wherein m is the total number of pixels in the digital mammographic image, $m_k$ is the number of pixels of gray level k, and n is the total number of gray levels; and
   (b) calculating a spatial correlation histogram $\bar{p}(k)$ of the digital mammographic image using equation (2)

$$\bar{p}(k) = \frac{\sum_{b=k-\alpha}^{k+\alpha} p(b|k)}{\sum_{a=0}^{n-1} \sum_{b=a-\alpha}^{a+\alpha} p(b|a)} \quad (2)$$

wherein the conditional probability p(b |a) is defined using equation (3)

$$p(b|a) = \frac{\sum_{u=0}^{N-1} \sum_{v=0}^{M-1} \left[ \sum_{w=u-\beta}^{u+\beta} \sum_{z=v-\beta}^{v+\beta} H(a, q(u, v)) \cdot H(b, q(w, z)) \right] / \sigma(\beta)}{\sum_{u=0}^{N-1} \sum_{v=0}^{M-1} H(a, q(u, v))} \quad (3)$$

$$\text{where } (, q(x, y)) = \begin{cases} 0 & g \neq q(x, y) \\ & = (x, y) \end{cases}$$

and q(x, y) is the gray level at pixel (x, y), $\sigma(\beta) = (2\beta+1) \times (2\beta+1)$; N and M are the width and height of a mammogram respectively; and the element q(x, y) denotes the probability of gray level being b for pixels in a neighborhood centered by a pixel with gray level being a;
   generating a combined histogram using the overall contrast enhanced histogram and the detail contrast enhanced histogram; and
   using the combined histogram to generate a contrast-enhanced digital mammographic image.

19. The method of claim 18, wherein the step of generating a combined histogram comprises steps of:
   selecting a gray level value on the first histogram as a threshold k';
   dividing the gray level space into two parts:

$$K = \{k | p(k^*) < k', p(k^*+1) \geq k', k=0,1,2, \ldots k^*\} \text{ and}$$

$$\bar{K} = \{0, 1, \ldots, n-1\} - K$$

calculating the combined histogram by combining the overall contrast enhanced histogram and the detail contrast enhanced histogram using equation (4)

$$p(k)_{new} = \begin{cases} p(k), & k \in K \\ \frac{\bar{p}(k)}{\sum_{i \in \bar{K}} \bar{p}(i)} \cdot \left(1 - \sum_{i \in K} p(i)\right), & k \in \bar{K} \end{cases} \quad (4)$$

calculating a cumulative distribution function $F(k)_{new}$ and a yield mapping function; and
mapping the combined histogram to a contrast-enhanced image based on the combined histogram using equation (5)

$$k' = n \cdot F(k)_{new} = n \cdot \sum_{i=0}^{k} p(i)_{new}. \quad (5)$$

20. The method of claim 18, wherein the step of generating a combined histogram comprises steps of:
   producing a new histogram using equation (6)

$$p(k)_{new} = \gamma p(k) + (1-\gamma)\bar{p}(k)^* \quad (0 < \gamma < 1). \quad (6);$$

calculating a cumulative distribution function $F(k)_{new}$ and a yield mapping function; and
mapping the new histogram to a contrast-enhanced image based on the combined histogram using equation (7)

$$k' = n \cdot F(k)_{new} = n \cdot \sum_{i=0}^{k} p(i)_{new}. \quad (7)$$

21. The method of claim 18, wherein the step of generating a combined histogram comprises steps of
   selecting a gray level value on the first histogram as a threshold k';
   dividing the gray level space into two parts:

$$K = \{k | p(k^*) < k', p(k^*+1) \geq k', k=0,1,2, \ldots k^*\} \text{ and}$$

$$\bar{K} = \{0, 1, \ldots, n-1\} - K;$$

producing a new histogram using equation (8)

$$\begin{cases} p(k)_{new} = \gamma p(k) + (1-\gamma)\bar{p}(k)^* (0 < \gamma < 1). & k \in K \\ p(k)_{new} = \gamma' p(k) + (1-\gamma')\bar{p}(k)^* (0 < \gamma' < 1) & k \in \bar{K}; \end{cases} \quad (8)$$

calculating a cumulative distribution function $F(k)_{new}$, and a yield mapping function; and
mapping the new histogram to a contrast-enhanced image based on the combined histogram using equation (7)

$$k' = n \cdot F(k)_{new} = n \cdot \sum_{i=0}^{k} p(i)_{new}. \quad (7)$$

22. A method for enhancing the image contrast of a digital mammographic image, comprising using a computer to perform steps of:

accessing the digital mammographic image;
generating a first histogram of the digital mammographic image;
generating an overall contrast enhanced histogram by applying histogram equalization to the first histogram;
generating a detail contrast enhanced histogram by applying spatial correlation histogram equalization to the first histogram, thereby preserving gray level detail at a tail end of the detail contrast enhanced histogram;
generating a combined histogram using the overall contrast enhanced histogram and the detail contrast enhanced histogram, the step of generating a combined histogram comprising steps of
(a) selecting a gray level value on the first histogram as a threshold k';
(b) dividing the gray level space into two parts:

$K=\{k|p(k^*)<k', p(k^*+1) \geq k', k=0,1,2,\ldots k^*\}$ and $\overline{K}=\{0,1,\ldots,n-1\}-K;$ (c) calculating the combined histogram by combining the overall contrast enhanced histogram and the detail contrast enhanced histogram using equation (4)

$$p(k)_{new} = \begin{cases} p(k), & k \in K \\ \dfrac{\overline{p}(k)}{\sum_{i \in \overline{K}} \overline{p}(i)} \cdot \left(1 - \sum_{i \in K} p(i)\right), & k \in \overline{K} \end{cases} \quad (4)$$

(d) calculating a cumulative distribution function $F(k)_{new}$ and a yield mapping function; and
(e) mapping the combined histogram to a contrast-enhanced image based on the combined histogram using equation (5)

$$k' = n \cdot F(k)_{new} = n \cdot \sum_{i=0}^{k} p(i)_{new}; \quad (5)$$

and
using the combined histogram to generate a contrast-enhanced digital mammographic image.

23. A method for enhancing the image contrast of a digital mammographic image, comprising using a computer to perform steps of:
accessing the digital mammographic image;
generating a first histogram of the digital mammographic image;
generating an overall contrast enhanced histogram by applying histogram equalization to the first histogram;
generating a detail contrast enhanced histogram by applying spatial correlation histogram equalization to the first histogram, thereby preserving gray level detail at a tail end of the detail contrast enhanced histogram;
generating a combined histogram using an unequally weighted combination of the overall contrast enhanced histogram and the detail contrast enhanced histogram, the generating a combined histogram comprising steps of:

(a) producing a new histogram using equation (6)

$p(k)_{new} = \gamma p(k)+(1-\gamma)\overline{p}(k)^* \; (0<\gamma<1). \; (6);$ (b) calculating a cumulative distribution function $F(k)_{new}$ and a yield mapping function; and
(c) mapping the new histogram to a contrast-enhanced image based on the combined histogram using equation (7)

$$k' = n \cdot F(k)_{new} = n \cdot \sum_{i=0}^{k} p(i)_{new}; \quad (7)$$

and
using the combined histogram to generate a contrast-enhanced digital mammographic image.

24. A method for enhancing the image contrast of a digital mammographic image, comprising using a computer to perform steps of
accessing the digital mammographic image;
generating a first histogram of the digital mammographic image;
generating an overall contrast enhanced histogram by applying histogram equalization to the first histogram;
generating a detail contrast enhanced histogram by applying spatial correlation histogram equalization to the first histogram, thereby preserving gray level detail at a tail end of the detail contrast enhanced histogram;
generating a combined histogram using the overall contrast enhanced histogram and the detail contrast enhanced histogram, the generating a combined histogram using a combination of weighting factors and gray scale level spaces and comprising steps of:
(a) selecting a gray level value on the first histogram as a threshold k';
(b) dividing the gray level space into two parts:

$K=\{k|p(k^*)<k', p(k^*+1) \geq k', k=0,1,2,\ldots k^*\}$ and $\overline{K}=\{0,1,\ldots,n-1\}-K;$ (c) producing a new histogram using equation (8)

$$\begin{cases} p(k)_{new} = \gamma p(k)+(1-\gamma)\overline{p}(k)^*(0<\gamma<1). & k \in K \\ p(k)_{new} = \gamma' p(k)+(1-\gamma')\overline{p}(k)^*(0<\gamma'<1) & k \in \overline{K}; \end{cases} \quad (8)$$

(d) calculating a cumulative distribution function $F(k)_{new}$, and a yield mapping function; and
(e) mapping the new histogram to a contrast-enhanced image based on the combined histogram using equation (7)

$$k' = n \cdot F(k)_{new} = n \cdot \sum_{i=0}^{k} p(i)_{new}; \quad (7)$$

and
using the combined histogram to generate a contrast-enhanced digital mammographic image.

* * * * *